United States Patent [19]
Marshall et al.

[11] Patent Number: 6,082,836
[45] Date of Patent: Jul. 4, 2000

[54] COMPACT DISC CASE AND SHELVING UNIT THEREFORE

[75] Inventors: Stephen Welsford Marshall, Toronto; Jean Christophe Charlier; Pierre Tardif, both of Longueiuil; Paul Leonidis, Toronto, all of Canada

[73] Assignee: Discarmour Industriale Limited, Toronto, Canada

[21] Appl. No.: 09/143,617

[22] Filed: Aug. 28, 1998

[51] Int. Cl.[7] .............................. A47B 81/06; B65D 85/57
[52] U.S. Cl. ................... 312/9.57; 312/9.63; 312/319.1; 206/308.1
[58] Field of Search ..................................... 312/9.9, 9.47, 312/9.48, 9.57, 9.63, 319.1; 206/308.1, 307, 308.3

[56] References Cited

U.S. PATENT DOCUMENTS

| | | | |
|---|---|---|---|
| 4,703,533 | 11/1987 | Seifert | 312/9.22 |
| 4,929,861 | 5/1990 | Metcalf | 312/9.63 |
| 5,135,106 | 8/1992 | Morrone | 206/308.1 |
| 5,505,299 | 4/1996 | Ditzig et al. | 206/308.1 |
| 5,645,329 | 7/1997 | Madock | 312/9.63 |
| 5,715,938 | 2/1998 | Cheris et al. | 206/308.1 |
| 5,720,387 | 2/1998 | Young | 312/9.11 X |
| 5,795,042 | 8/1998 | Todor | 312/221 |
| 5,833,331 | 11/1998 | Chang | 312/9.57 X |

*Primary Examiner*—Peter M. Cuomo
*Assistant Examiner*—Hanh V. Tran
*Attorney, Agent, or Firm*—Dowell & Dowell, P.C.

[57] ABSTRACT

A compact disc case of the type that is in general use, having a lid hinged to its tray, as well as cab storage unit therefore. The compact disc case has a gripper strip located rearwardly of the hinge axis; and a resilient latch for unlocking the lid from the tray. There is also a resilient members which urges the lid to an open position and moves the lid to the open position upon release of the resilient latch. The compact disc casing cabinet works in combination with the compact disc case. The compact disc casing cabinet also has a releasable latch such that when the releasable latch is released the compact disc casing is moved forwardly by a resilient element with respect to the slot to permit opening of the casing without its removal from the slot.

6 Claims, 8 Drawing Sheets

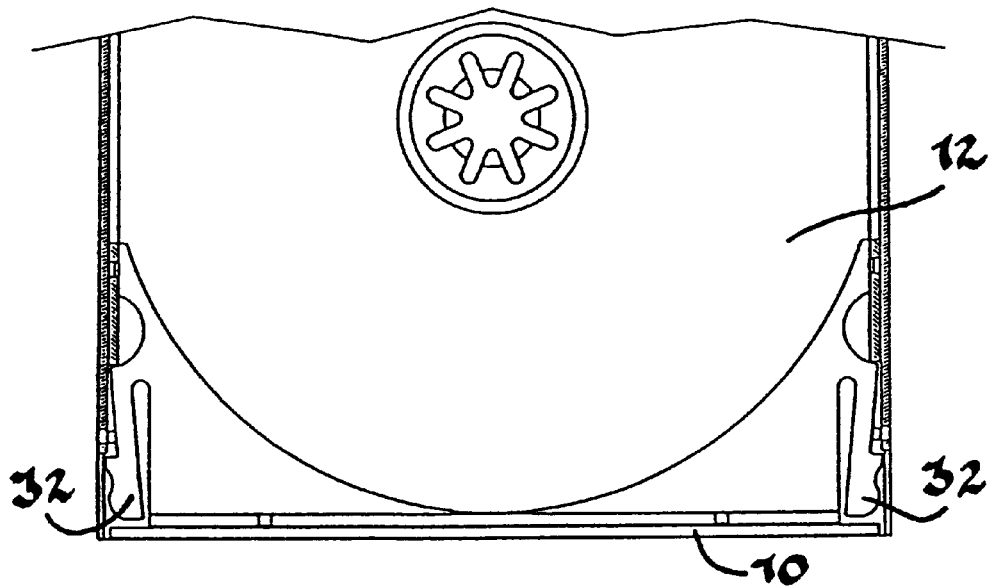
FIGURE 4
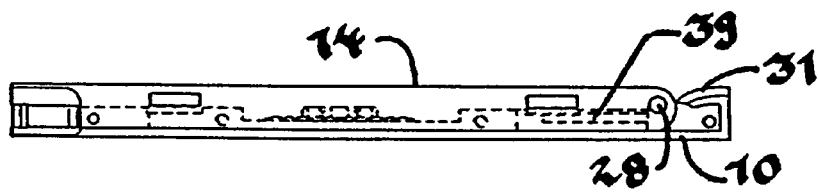
FIGURE 5
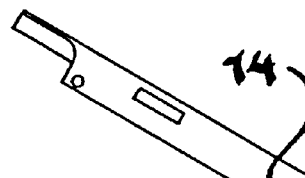
FIGURE 6
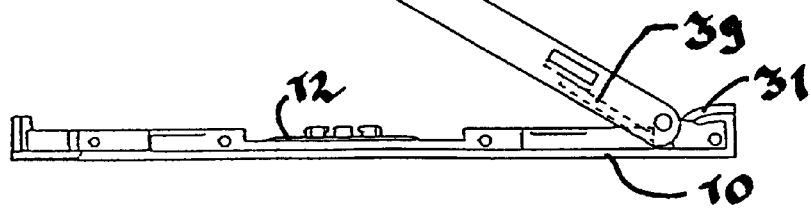

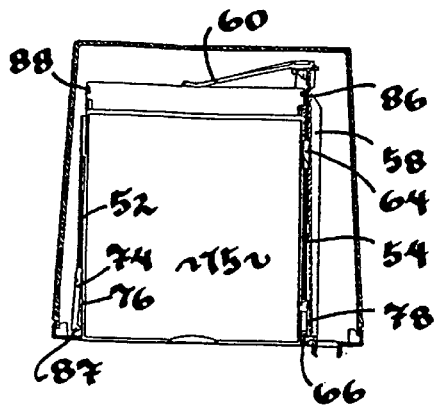
FIGURE 13
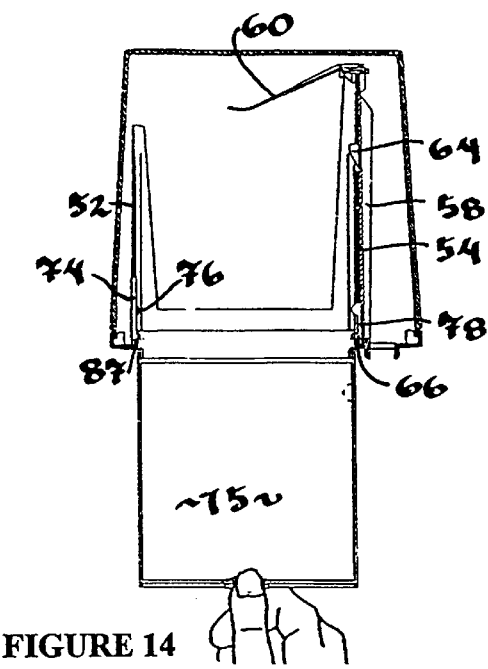
FIGURE 14
FIGURE 15
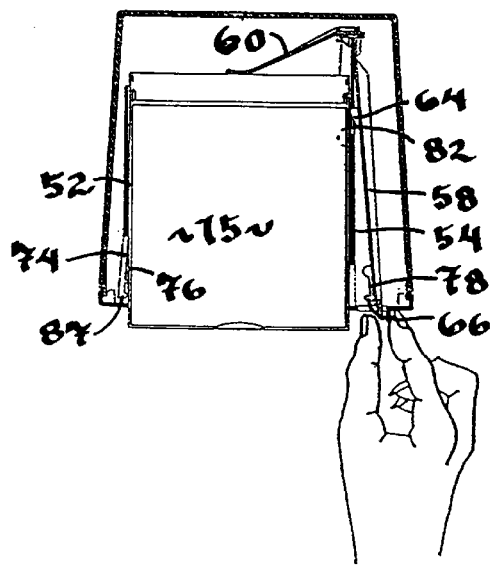
FIGURE 16
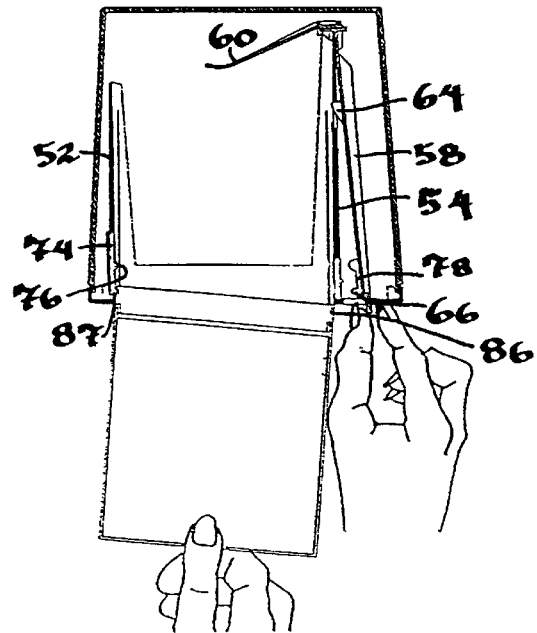

COMPACT DISC CASE AND SHELVING UNIT THEREFORE

This invention relates to a compact disc case of the type that is in general use. These cases are made of a hard clear plastics material and have a tray, a lid hinged to the tray for movement between a closed and an open position and a compact disc holder mounted in the tray. The compact disc is retained in the disc holder and display art work and reading material related to the stored disc is contained by the tray and cover and readable from the outside of the case through the clear plastics material of the cover and tray.

BACKGROUND OF THE INVENTION

To remove a compact disc from the compact disc case one grips opposed opening edges of the tray and cover and manipulates them to the open position against the holding force of an interlocking pin and hole securing means. It is an awkward operation requiring the separation of two very thin components, the tray and the cover. In practice, it is common for the hands of the user to slip and spill the case and contents on the floor. The cases are not strong and, in result, there are many compact disc cases with the hinged connection between tray and cover broken.

This unsatisfactory state of affairs with compact disc cases has existed for almost as long as compact discs have been in common use.

SUMMARY OF THE INVENTION

This invention overcomes these difficulties and provides a compact disc case of the general type that is presently in use but which is convenient to hold in a secure manner as it is opened. It is thus not prone to being dropped as it is opened. Moreover, it is structurally stronger at the hinge point of the lid to the tray and, in the event of being dropped is not as likely to suffer breakage. The compact disc case of this invention has a unique gripper strip that contributes to its easier handling and this same gripper strip increases the advantages of storing the cases in a cabinet. It is possible to partially remove a compact disc case of this invention and then remove the compact disc without taking the case from the cabinet. This is not possible with the standard compact disc case design.

It is therefore an object of this invention to provide a new compact disc case having a convenient gripper strip with which one can more conveniently handle the casing in use.

It is a further object of the invention to provide a compact disc case having a simple latch to hold the tray and lid closed that can be manually released while holding the case by the gripper strip.

It is a further object of the invention to provide a case with a resilient means stressed to urge the lid to an open position when the lid is closed that will move the lid to an open position when a resilient latch means is released.

It is a further object of this invention to provide a compact disc case and cabinet combination wherein the case can be withdrawn sufficiently to permit removal of the compact disc therefrom without complete removal of the case from the cabinet.

It is a further object of the invention to achieve all the above objectives with a structure that adds little significant, if any, cost to the manufacture.

With these and other objects in view according to one aspect of the present invention there is provided in a compact disc case of the type having a tray; a lid hinged to the tray for movement between a closed position and an open position, the lid being parallel to the tray in a closed position by side walls; a compact disc holder mounted in said tray; the tray and the lid being of a plastics material; the back edge of said lid being in advance of the back edge of the tray in the closed position whereby to define a gripper strip along the back margin of the case; the improvement of: locating the hinge axis of the lid on the tray in advance of said gripper strip a distance such that the back edge of the lid does not interfere with access to the gripper strip when the lid of the tray is in an open position.

According to another aspect of the present invention, there is provided in combination, a compact disc casing a compact disc casing cabinet; the compact disc casing cabinet having a stack of slots, each slot being adapted to receive a compact disc casing; a latch lever with a closure latch and a release latch; catch means for said closure latch on a side of said compact disc casing; catch means for said release latch on a side of said compact disc casing; the latch lever being biased to urge said closure latch into its catch means when the closure latch is aligned with the catch means; the latch lever being biased to urge the release latch into its catch means when the release latch is aligned with the catch means; the latch lever being manually operable to overcome the bias of the latch lever to remove the closure latch from its catch means; the latch lever being manually operable to overcome the bias of the latch lever to remove the release latch from its catch means; the closure latch being aligned with the catch means when the compact disc casing is fully inserted within its respective slot; resilient means compressible against insertion pressure as said compact disc casing is fully inserted into its respective slot and adapted to reassert itself when the latch lever is manually operated to overcome its bias to remove said closure latch from its catch means to urge said compact disc casing partially out of its respective slot; the compact disc casing being fully removable from its respective slot when said latch lever is manually operated to remove said release latch from its catch means; the release latch being aligned wit its catch means when substantially only the gripper strip of the compact disc casing is in the slot whereby the cover of the compact disc casing can be opened to remove or insert a compact disc in the tray thereof.

Another aspect of the invention is a disc case of the forgoing characteristics in combination with a storage cabinet for disks.

BRIEF DESCRIPTION OF THE DRAWINGS

The invention will be clearly understood after reference to the drawings and the specification which follow.

In the drawings

FIG. 4 is a partial sectional view along line 4—4 of FIG. 1 illustrating the resilient latch of the compact disc holder and the manner that it engages with the catch means of the lid in use.

FIG. 5 is a side elevation in the closed position of the lid.

FIG. 6 is a side elevation in the open position of the lid.

FIG. 12a is an illustration of the cabinet;

FIGS. 13 to 16 are successive illustrations of a compact disc case being withdrawn from a cabinet.

DESCRIPTION OF THE PREFERRED EMBODIMENTS

Figure 1:
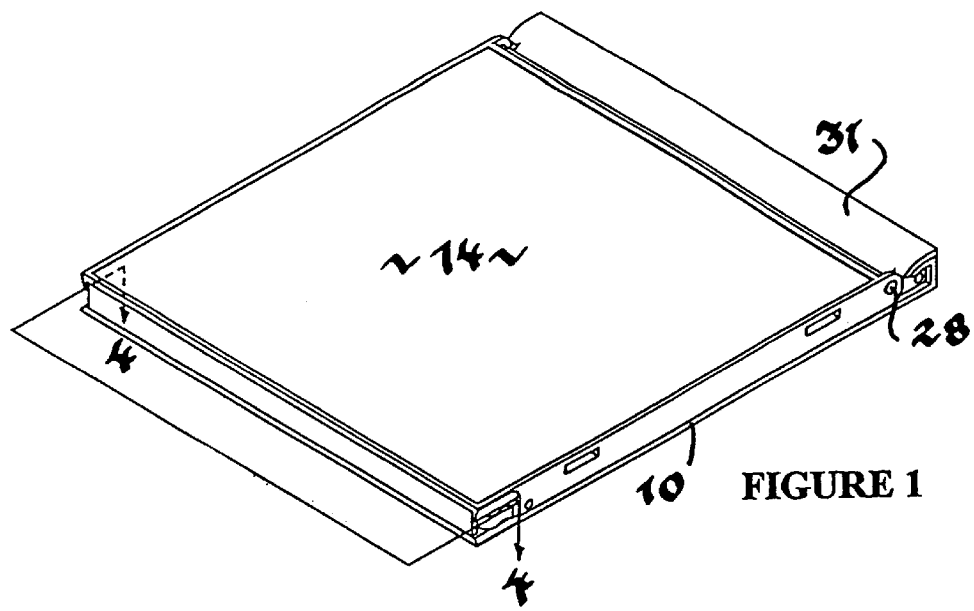
FIG. 1 is an illustration of a compact disc case in the closed position.
Figure 2:
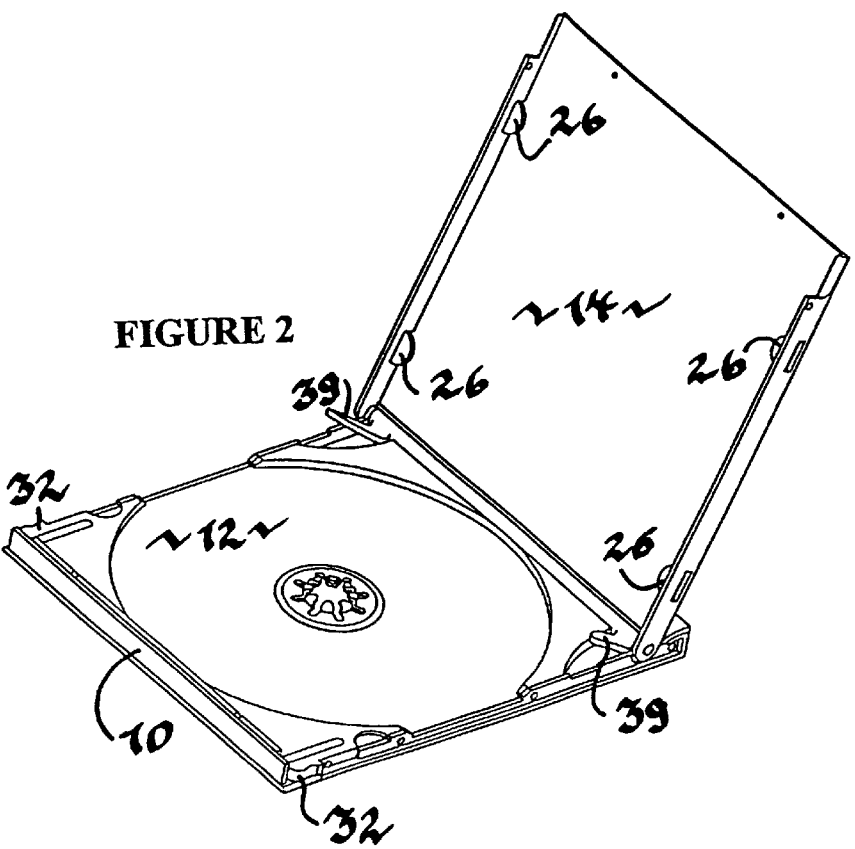
FIG. 2 is an illustration of the case of FIG. 1 in the open position.
Figure 3:
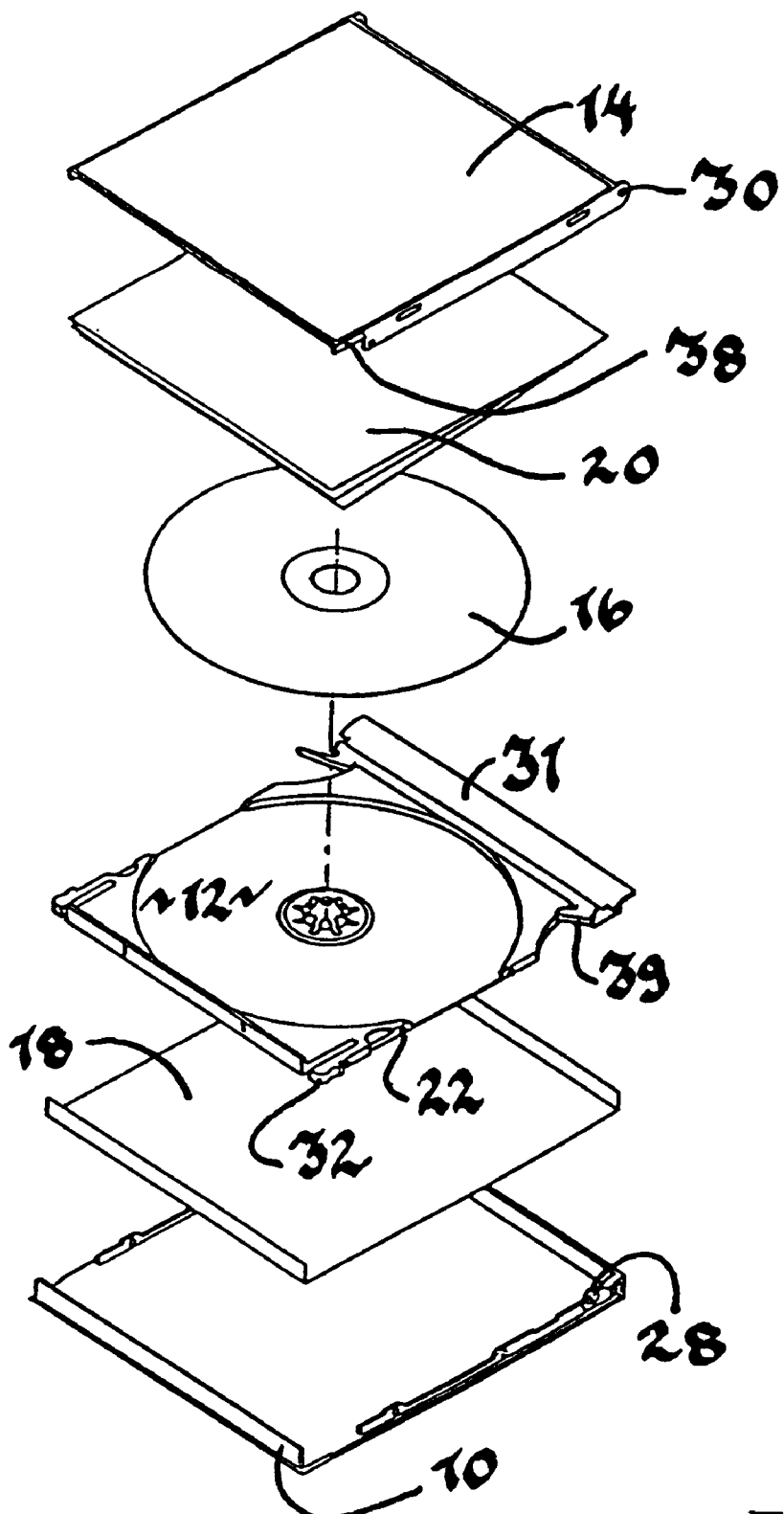
FIG. 3 is an illustration of the component parts of the case together with the graphic materials and a compact disc that are usually used with it.

Referring first to the compact disc case illustrated in FIGS. 1 to 6, the component parts of the casing and the compact disc and graphic materials used therewith are illustrated in FIG. 3 of the drawings. The basic elements are the tray 10, the compact disc holder 12 and the lid 14. The tray, lid and compact disc holder can be all made from the same suitably durable plastics material such as polystyrene. The general manner of assembly of these parts and the manner in which they combine to contain the compact disc 16, the promotional art work 18 and the booklet 20 is well known. Essentially, the art work 18 underlies the compact disc holder to display the art work through the transparent tray. The compact disc holder 12 has mounting pins 22 that are sprung into holes 24 in the sides of the tray as the assembly is put together. The pamphlet 20 is held in place in the lid by buttons 26 on opposed sides walls of the lid. The tray 12 has also has aligned mounting pins 28 over which aligned holes 30 in the side wall of the lid are sprung to mount the lid on the tray about a hinge axis that extends through the two pins.

The general method of mounting the compact disc holder and the lid are well known but the location of the lid mounting pins 28 is new and from it very substantial advantages flow. As is apparent from FIGS. 1, 2, 5, and 6 the hinge axis of the lid 14 on the tray 10 is in front of a gripper strip 31 so that when the lid is hinged to an open position as illustrated in FIGS. 2 and 6 the back edge of the lid does not interfere with the gripper strip. It will be noted that the top surface of the gripper strip 31 is part of the compact disc holder 12 and also that it slopes forwardly and downwardly from its back edge to assist a user to obtain a good grip on the case. Previously, the hinge axis of the lid was adjacent the back edge of the tray so that when the lid is opened the back edge of the lid overlies what is the gripper strip in this invention and interferes with any reasonable intention to manipulate the case by gripping the gripper strip.

Thus, to open a case of the prior art, it is common to grip the front edges of the tray and lid and separate them. It is a clumsy operation and often results in dropping the whole unit, often with resulting breakage of the hinge joint of the tray and lid. The tray of the prior art is weakened by the holes made for the hinge pins at the corner. By eliminating the necessity for holes in the tray at the corner the strength of the unit at the corners is improved. This is important because if the unit is dropped for any reason it is at th is location that it often breaks.

In the embodiment of the invention shown FIGS. 1 to 6, the lid 14, when released, is urged towards the open position by the resilient fingers 39 formed on opposite sides of the compact disc holder as illustrated in FIGS. 2, 5 and 6. The lid is maintained in a closed position by means of a resilient latch 32 that is formed integrally with the compact disc holder 12 as illustrated. It has a pin 34 that enters a hole 36 in the side flange of the lid to keep the lid closed. The side flange of the lid is cut away at its front ends as at 38 to permit access to the latch so that when it is desired to open the lid to access the compact disc one manually presses the latch members 32 towards each other as indicated in FIG. 4. This pulls the pins from their respective holes in the flange of the lid to permit the lid to open under the influence of resilient fingers.

Figure 7:
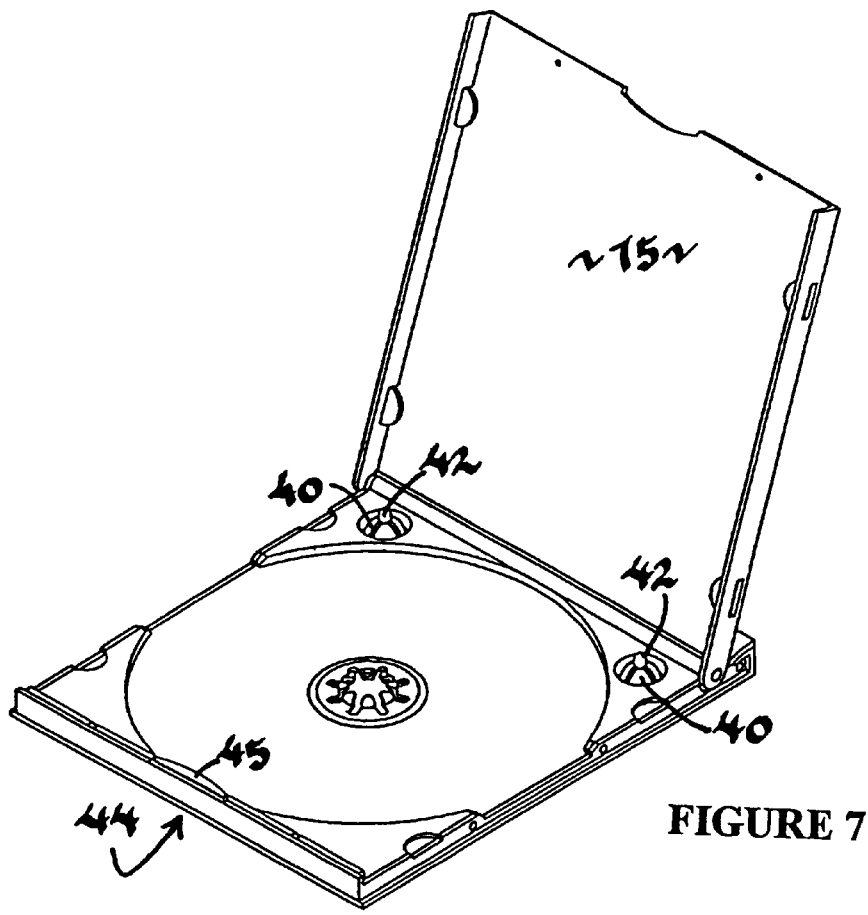
FIG. 7 is a perspective illustration of compact disc case with alternative spring lid opening means and alternative latch securement means for the tray and lid shown in the open position.
Figure 8:
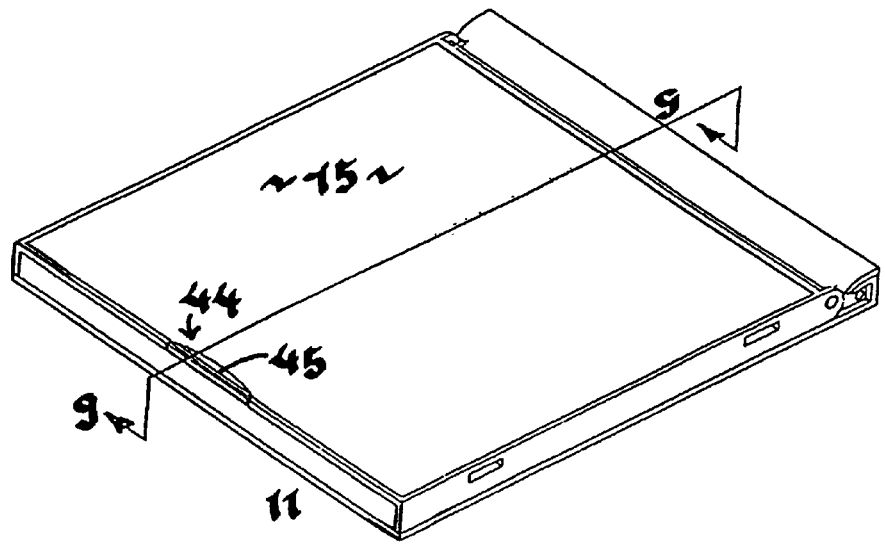
FIG. 8 is a perspective illustration of the compact disc shown in FIG. 7 in the closed position.
Figure 9:
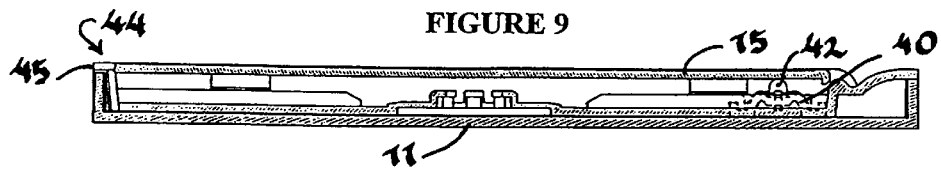
FIG. 9 is a cross-sectional illustration taken along lines 9—9 of FIG. 8.
Figure 10:
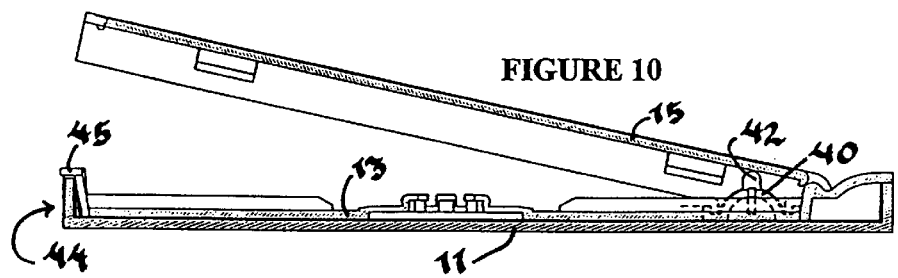
FIG. 10 is a cross-sectional illustration of the compact disc case illustrated in FIG. 9 taken along the same lines, but with the lid being opened by the alternative spring lid opening means.

FIG. 7 is an illustration of a compact disc case in which the design of the spring 39 shown in FIG. 1 has been varied and in which the design of the latch means for opening and closing the lid has been varied. In it, the tray, compact disc holder and lid have been numbered 11, 13 and 15 respectively. The spring devices are resilient rubber units that have a rubber dome 40 with a peg 42 extending therefrom. As the lid is closed, it engages the pegs 42 and compresses the rubber domes against their resilient properties. When the lid is freed to open, the rubber domes reassert themselves and carry the the lid to the open position. The latching arrangement on the front edge of the case is generally indicated by the numeral 44 and latches shut when the lid and tray are closed and remains so until the latch is manually released by depressing the latch bar 45 from the outside of the casing. Latch bar 45 integrally formed on the top of the front wall of cd holder 13 overlies a portion of the edge of cover 15 as in FIG. 9 to maintain the top 15 closed. Latch bar 45 is accessible to manual operation at its front side and can be manually moved forwardly as shown in FIG. 10 to permit lid 15 to rise under action of resilient dome members 40. Latch bar 45 is resiliently supported by the cd holder 13 and returns to position 9 when released so that it automatically locks when the lid 15 is closed.

Figure 11:
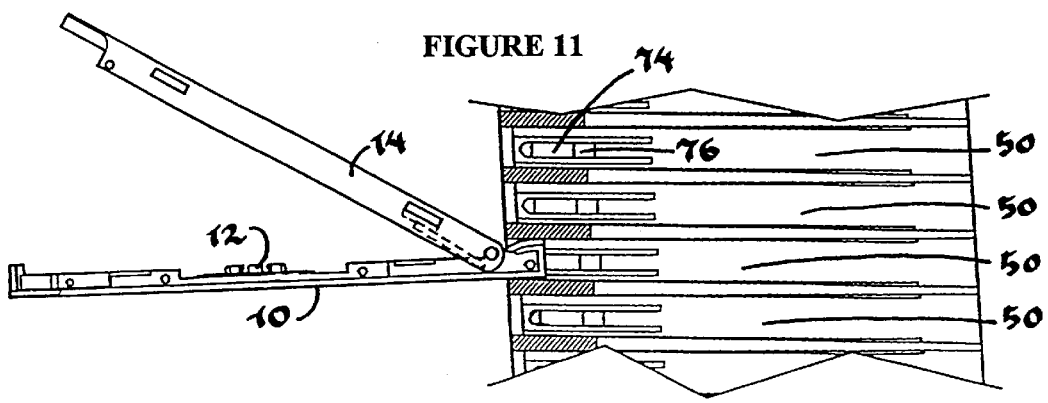
FIG. 11 is a schematic illustration of a compact disc case retained in a slot of a storage cabinet with the gripper strip only of the case in the slot of the cabinet and the lid open for deposit of a compact disk.

The compact disc case described has good utility of itself. With it, one can more easily access discs in their casing without danger of dropping and breaking the case and disk. It is of increased utility in combination with a related storage cabinet 48 that has a stack of slots 50, each adapted to house a single case as generally illustrated in FIG. 13 of the drawings. A feature is that the case can be supported cantilever style as the gripper strip is retained within the slot as illustrated in FIG. 11. While in this position, the lid can be opened by the opening latch arrangement, and the disc removed and replaced. The lid can be reclosed and the case can be slid back into the casing. The case can also be completely removed if desired.

Figure 12:
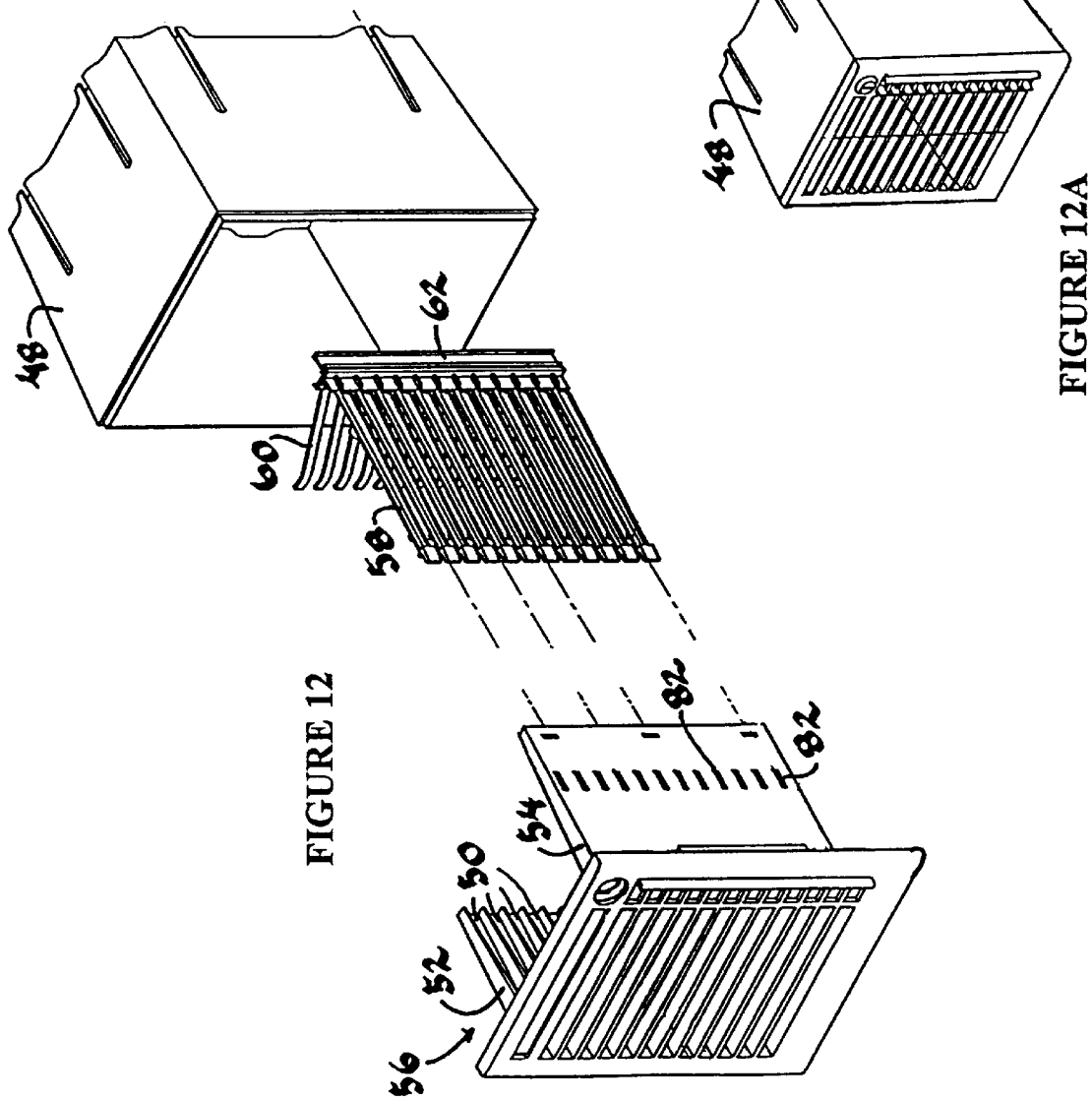
FIG. 12 is an illustration of the component parts of a cabinet.

FIG. 12 illustrates the basics of the cabinet. The slots 50 are formed in the opposed walls 52 and 54 of the frame member 56. They are spaced to slidably receive the closed cases through openings in the front wall of the frame member.

Latch levers 58 and spring members 60 are independently mounted on a spine 62 that is secured into the casing 48 to dispose the latch members and the spring members relative to the slots as will be explained. There is a spring member and latch member for each slot.

FIGS. 13 to 16 illustrate these parts in their assembled relation to each other and their function in the storage of a compact disc case. The compact disc case illustrated is the case of FIGS. 7 to 10 but it will be understood that the case of FIGS. 1 to 6 is identical in respect of the operation of the storage in the cabinet.

The latch levers 58 control the storage and release of the compact disc cases in the cabinet. These levers each have two latches, a closure latch 64 and a release latch 66. They are mounted to the rigid spine 62 (see FIG. 12). The opposed side walls of the slots are indicated by the numeral 52 and 54. They are spaced apart to permit the easy passage of a compact disc case and in each case provision is made for a latterly resilient bearing. In the case of sidewalls 52, the front portion of the wall is cut away to provide resilient fingers 74 (FIGS. 11 and 13) upon which is formed an rounded bearing bar 76 the outer rounded extremity of which bears against the side of the compact disc casing 15. (FIGS. 13 to 16) on the other side of the slot a similar rounded bearing bar 78 is formed on the latch lever 58. Thus the compact disc casing has a gentle lateral resilient support as it slides in and out of its slot. As will be noted from FIGS. 13 to 16, the bearing bar 78 enters a hole in the side wall of the slot to make bearing contact.

Getting back to the operation of the resilient latch lever 58, in FIG. 13, the closure latch 64 of the latch lever is shown passing through a rectangular slot 82 in the side of the cabinet (FIG. 12) to engage in a rectangular slot 84 (see FIG. 17) in the side of the lid of the compact disc casing. The resilience of the latch lever normally maintains this position in which the compact disc case is locked in its slot in the cabinet.

When the latch lever 58 is moved to the right as illustrated in FIG. 15 the closure latch 64 is withdrawn from the catch hole 84 on the lid of the compact disc casing and loaded leaf spring 60 reasserts itself to move the case forward to the position of FIG. 14. When the latch lever is released it assumes its normal position and the bearing bar 78 again bears on the side of the compact disc casing. In this configuration, the case can be manually withdrawn to the position of FIG. 15.

In the position of FIG. 15, the release latch pin 66 of the latch lever 58 engages in a hole 86 on the side of the tray near its back end to prevent withdrawal of the case from the slot. It will be noted that the arms 74 also have a release pin 87 similar to pin 66 that engages in a hole similar to hole 88 on the other side of the case. In this position a user can operate the latch that controls the lid and tray to open the case and remove the compact disk. It will be noted that the case is held within the slot by the gripper strip and that while so held the lid can be fully opened to remove and replace the disk.

However, in use it may be desired to remove the compact disc casing from the cabinet. This is achieved by again moving the latch lever 58 to the right as in FIG. 16 to pull the pin 66 from hole 86 in the case. This frees the corner and the case can be pivoted about the pin 87 and removed.

The case can be reinserted by reversing the procedures.

Figure 17:
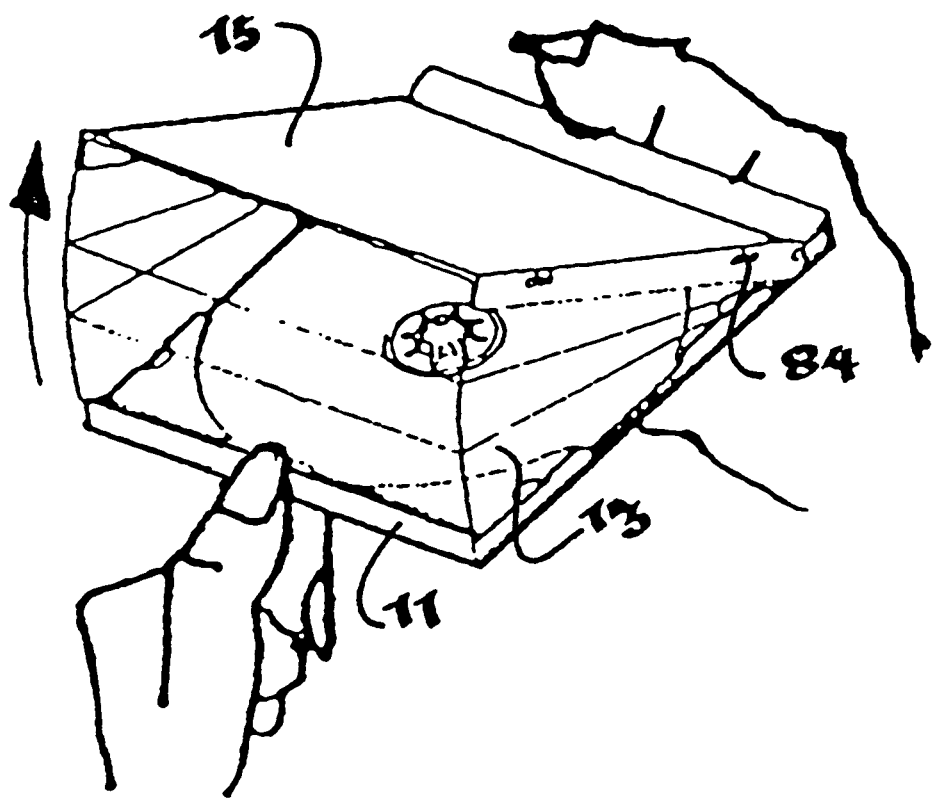
FIG. 17 is an illustration showing the manner of use of single compact disc casing.

The advantages of the invention are well illustrated in FIG. 17. The case can be securely gripped with one hand by the gripper strip 30 while the free hand operates the latch to open the lid and expose the disc for removal with the free hand. At no time are both hands required for the opening or any other single operation and the case is always securely held. The gripper strip is also the means of supporting the case in the slot of the cabinet to permit access to the contents without removing the case from the cabinet.

Embodiments of the invention other than the ones described will be apparent to those skilled in the art and it is not intended that the forgoing description should be read in a limiting sense in any way.

We claim:

1. In a compact disc case of the type having a tray; a lid hinged to said tray for movement between a closed position and an open position, said lid being parallel to said tray in a closed position by side walls; a compact disc holder mounted in said tray; said tray and said lid being of a plastics material; a back edge of said lid being in advance of a back edge of said tray in the closed position whereby to define a gripper strip along the back margin of said case; wherein:

the hinge axis of said lid is located on said tray in advance of said gripper strip a distance such that the back edge of said lid does not interfere with access to said gipper strip when said lid of said tray is in an open position;

a resilent latch means carried by said compact disc holder;

said lid being formed with a catch for engagement with said resilient latch means when said lid is moved to a closed position;

said resilient latch means being manually releasable from locking engagement with said catch to free said lid for movement to an open position;

resilient means carried by said compact disc holder and stressed to urge said lid in the direction of an open position when said lid is in a closed position and to move said lid to an open position when said resilient latch means is released from said catch.

2. In a compact disc case of the type having a tray; a lid hinged to said tray for movement between a closed position and an open position, said lid being parallel to said tray in a closed position by side walls; a compact disc holder mounted in said tray; said tray and said lid being of a plastics material; the back edge of said lid being in advance of the back edge of said tray in the closed position whereby to define a gripper strip along the back margin of said case; as claimed in claim 1 in which:

said resilient latch means is integrally formed with said compact disc holder.

3. In a compact disc case of the type having a tray; a lid hinged to said tray for movement between a closed position and an open position, said lid being parallel to said tray in a closed position by side walls; a compact disc holder mounted in said tray; said tray and said lid being of a plastics material; the back edge of said lid being in advance of the back edge of said tray in the closed position whereby to define a gripper strip along the back margin of said case; as claimed in claim 2 in which:

said resilient means stressed to urge said lid to an open position is integrally formed with said compact disc holder.

4. In a compact disc case of the type having a tray; a lid hinged to said tray for movement between a closed position and an open position, said lid being parallel to said tray in a closed position by side walls; a compact disc holder mounted in said tray; said tray and said lid being of a plastics material; the back edge of said lid being in advance of the back edge of said tray in the closed position whereby to define a gripper strip along the back margin of said case; as claimed in claim 1 in which:

said resilient means stressed to urge said lid to an open position is integrally formed with said compact disc holder.

5. In combination, a compact disc casing and a compact disc casing cabinet wherein:

said compact disc case comprises a tray; a lid hinged to said tray for movement between a closed position and an open position, said lid being parallel to said tray in a closed position by side walls; a compact disc holder mounted in said tray; said tray and said lid being of a plastics material; a back edge of said lid being in advance of a back edge of said tray in the closed position whereby to define a gripper strip along the back margin of said case; the hinge axis of said lid being located on said tray in advance of said gripper strip a distance such the back edge of said lid does not interfere with access to said gripper strip when said lid of said tray is in an position; and said compact disc casing cabinet having a stack of slots, each slot being adapted to receive a compact disc casing; a latch lever with a closure latch and a release latch; catch means for said closure latch on a side of said compact disc casing; said latch lever being biased to urge said closure latch into its catch means when said closure latch is aligned with said catch means; said latch lever being biased to urge said release latch into its catch means when said release latch is aligned with said catch means; said latch lever being manually operable to overcome said bias of said latch lever to remove said closure latch from its catch means; said latch lever being manually operable to overcome said bias of said latch lever to remove said release latch from its catch means; said closure latch being aligned with said catch means when said compact disc casing is fully inserted within its respective slot; resilient means compressible against insertion pressure as said compact disc casing is fully inserted into its respective slot and and adapted to reassert itself when said latch lever is manually operated to overcome its bias to remove said closure latch from its catch means to urge said compact disc casing partially out of its respective slot; said compact disc casing being fully removable from its respective slot when said latch lever is manually operated to remove said release latch from its catch means; said release latch being aligned with its catch means when substantially only said gripper strip of said compact disc casing is in said slot whereby said cover of said compact disc casing can be opened to remove or insert a compact disc in the tray thereof.

6. In combination, a compact disc casing and a compact disc casing cabinet wherein:

said compact disc case comprises a tray; a lid hinged to said tray for movement between a closed position and an open position, said lid being parallel to said tray in a closed position by side walls; a compact disc holder mounted in said tray; said tray and said lid being of a plastics material; a back edge of said lid being in advance of a back edge of said tray in the close position whereby to define a gripper strip along the back margin of said case; the hinge axis of said lid being located on said tray in advance of said gripper strip a distance such that the back edge of said lid does not interfere with access to said gripper strip when said lid of said tray is in an open position; and said compact disc casing cabinet has a stack of slots, each slot being adapted to receive a compact disc casing; a closure latch biased to a closed position; a release latch biased to a closed position; manually operable means to overcome said bias of said closure latch to release said closure latch; manually operable means to overcome said bias of said release latch means to release said release latch; resilient means compressible against insertion pressure as said compact disc casing is fully inserted into its respective slot and adapted to reassert itself when said closure latch is released to urge said compact disc casing partially out of its respective slot; said compact disc casing being fully removable from its respective slot when said release latch is released, said release latch being biased to a closed position when substantially only said gripper strip of said compact disc casing is in said slot whereby said cover of said compact disc casing can be opened to remove or insert a compact disc without removing the casing from its slot.

* * * * *